May 2, 1950          J. R. RISTOW          2,506,278
WHEEL BEARING
Filed June 19, 1948
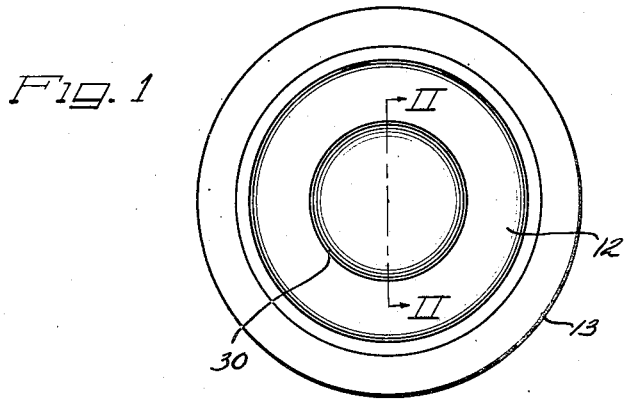
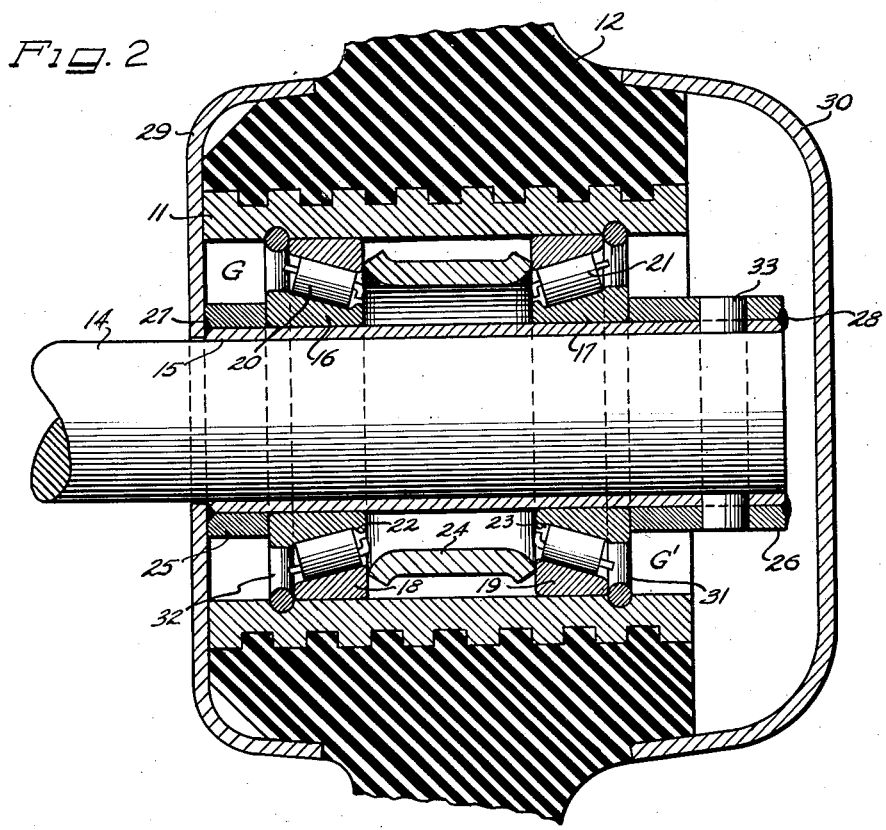
Inventor
JOHN R. RISTOW Patented May 2, 1950

2,506,278

UNITED STATES PATENT OFFICE 2,506,278

WHEEL BEARING

John R. Ristow, Chicago, Ill., assignor to St. John & Co., Chicago, Ill., a corporation of Illinois Application June 19, 1948, Serial No. 34,100

2 Claims. (Cl. 308—211)

This invention relates to improvements in removable bearings for wheels, and particularly to a frictionless bearing which may readily be inserted as a unit into a wheel hub.

While the invention may be used in various vehicles, it is particularly suited for use on small trucks, usually hand propelled, which have as an integral part thereof rods permanently mounted thereon constituting fixed axles, and on which the wheels are intended to be mounted.

One of the objects of the invention is to provide a removable frictionless bearing unit of the type described and employing roller bearings.

Another object of the invention is to provide a removable wheel bearing unit having two oppositely inclined roller bearing assemblies to provide for the absorption of side thrust in two directions, all assembled as a unit which may readily be slid onto a stationary fixed wheel axle.

Another object of the invention is to provide a preassembled roller bearing unit mounted on a sleeve prepared for sliding over a fixed axle and proportioned to be slipped inside of a wheel hub of known dimensions.

Other objects and advantages of the invention will become apparent from a perusal of the specification or will be mentioned specifically hereinafter.

On the drawings:

Figure 1 is side elevation showing a wheel of the type for which this invention is adapted.

Figure 2 is a longitudinal sectional view on the line II—II of Figure 1 showing the removable wheel bearing unit.

As shown on the drawings:

The type of wheel for which this invention is particularly adapted comprises a wheel having a hub member 11, which is preferably a metal casting having a cylindrical bore and having a grooved outer surface upon which a rubber wheel web 12 is molded, the web of the wheel being surmounted by a rubber tread portion 13. Webs and treads of other compositions could, of course, be secured to or formed integrally with the hub.

As wheels of this type are ordinarily attached to relatively small hand drawn trucks and such trucks are provided with rigid non-rotatable axles, I have shown in the drawings such an axle 14, which may be assumed to be secured non-rotatably to the body of the truck. Since the axle need not provide a smooth bearing surface for a rotating part it need not be smoothly finished nor hardened. It may be merely good steel rod stock. In the bearing unit I provide a sleeve 15 which may be formed from pipe stock, and assembled upon this sleeve are the inner roller bearing races 16 and 17 and the outer bearing races 18 and 19, each pair of races carrying a plurality of rollers such as 20 and 21. The inner races are appropriately shaped as at the areas 22 and 23 to form rims to retain the rollers from sliding inwardly too far and are also slightly shaped around the opposite ends of the rollers to prevent their climbing on the inclined surface of the inner races.

The outer races 18 and 19 are held under pressure in spaced relationship by means of a preformed ring 24.

Also on the sleeve 15 laterally outside of the inner races 16 and 17 I mount sleeves 25 and 26 which should be tack welded where their outer margins coincide with the end portions of the sleeve 15, these tack welds being indicated at 27 and 28.

It will be perceived that the assembly thus described constitutes a compact roller bearing unit in which the roller bearing races are firmly held against longitudinal shifting by means of the outer rings 25 and 26 and the spacing ring 24.

The cup-shaped caps 29 and 30, which will later be further discussed are for the obvious purpose of excluding dust, water and other foreign matter from the bearings.

When a roller bearing assembly made in accordance with this invention is prepared, it may be inserted into a wheel hub as follows. A snap spring ring such as 31 or 32 will be first inserted in the groove provided therefor in the wheel hub 11. Thereafter from the end of the hub opposite that near which the spring ring has been inserted the bearing assembly will be forced into the wheel hub. These bearing assemblies will be proportioned to fit so snugly within the hubs that they will require some force to drive them into the hubs, although not enough to cause any undue pressure upon the contained rollers.

After the unit has been forced into the wheel hub, the other snap ring 31 or 32 will be put in place and the bearing unit is firmly thereupon anchored in the wheel hub.

Thereafter, the inner cup-shaped shield 29 will be placed upon the wheel hub as indicated and secured thereto in any appropriate manner, for example, by screws or pins (not shown).

The wheel hub and the bearing contained in it then may be slid over the axle, the sleeve 15 having a fairly close fit over the axle. Thereafter a pin 33, preferably having a slight taper, will be driven through the aligned apertures provided in the retaining ring 26, sleeve 15 and axle 14 thus firmly locking the wheel and its bearing upon the axle. The final step involves placing the outer cap 30 on the wheel hub and securing it thereto in any appropriate manner.

In Figure 2 there are two annular spaces indicated as G and G' located just outside of the snap rings 31 and 32. These spaces will ordinarily be filled by grease seals of any appropriate and suitable construction, but not forming a part of this invention.

The ease of assembly indicates how easy it is also to remove one of these wheel bearing units and replace it when it is worn out. The grease seals, when located as suggested, will serve to retain whatever grease is packed in the bearings, hence no trouble should arise in the matter of lubrication.

While a spacer ring 24 of the type indicated is preferred, some other spacer may be employed, of a design adequate to hold the roller races in proper spaced relation. The opposite inclination of the rollers serves the purpose of absorbing side thrust in opposing directions.

While the drawings and specification show a preferred embodiment of the invention, it should be understood that the invention is susceptible of some variation without departing from the scope of the invention as defined in the appended claims.

I claim as my invention:

1. In combination with a stationary axle and a wheel hub having a cylindrical bore, a pre-assembled roller bearing unit comprising a cylindrical sleeve proportioned to fit closely over the axle, inner and outer roller bearing races and rollers retained by them, the races being oppositely inclined toward each other to constitute thrust bearings of opposite inclination, spacer means located between said pairs of races and bearing against them for spacing the roller units apart, said bore of the wheel hub having circular grooves spaced apart just laterally beyond the outer roller races, snap rings engageable in said grooves for abutment with said outer races for retaining said outer races in the wheel hub, thrust collars secured to said sleeve laterally outside of and in contact with the inner roller races, and means for securing said sleeve to said axle.

2. In combination with a stationary axle and a wheel hub having a cylindrical bore, a pre-assembled roller bearing unit comprising a cylindrical sleeve proportioned to fit closely over the axle, inner and outer roller bearing races and rollers retained by them, the races being oppositely inclined toward each other to constitute thrust bearings of opposite inclination, spacer means located between said pairs of races and bearing against them for spacing the roller units apart, means for securing said outer races to said wheel hub against longitudinal displacement, thrust collars secured to said sleeve laterally outside of and in contact with the inner roller races, and means for securing said sleeve to said axle.

JOHN R. RISTOW.

REFERENCES CITED

The following references are of record in the file of this patent:

UNITED STATES PATENTS

| Number | Name | Date |
|---|---|---|
| 1,402,149 | Dekker | Jan. 3, 1922 |
| 1,574,799 | Dierks | Mar. 2, 1926 |
| 1,689,496 | Moore | Oct. 30, 1928 |
| 2,155,916 | Weckstein | Apr. 25, 1939 |

FOREIGN PATENTS

| Number | Country | Date |
|---|---|---|
| 276,005 | Italy | July 9, 1930 |